(12) United States Patent
Collins et al.

(10) Patent No.: US 8,222,765 B2
(45) Date of Patent: Jul. 17, 2012

(54) PHOTOVOLTAIC POWER PLANT OUTPUT

(75) Inventors: Kevin Collins, Park Ridge, NJ (US);
Bruce Curtis, Whitehouse Station, NJ (US); Robert R. Baldwin, Jr., Bridgewater, NJ (US)

(73) Assignee: First Solar, Inc., Perrysburg, OH (US)

( * ) Notice: Subject to any disclaimer, the term of this patent is extended or adjusted under 35 U.S.C. 154(b) by 0 days.

(21) Appl. No.: 12/705,930

(22) Filed: Feb. 15, 2010

(65) Prior Publication Data
US 2010/0231045 A1 Sep. 16, 2010

Related U.S. Application Data

(60) Provisional application No. 61/152,345, filed on Feb. 13, 2009.

(51) Int. Cl.
*H02J 1/10* (2006.01)
*H02J 3/38* (2006.01)
*H02J 7/34* (2006.01)

(52) U.S. Cl. ......................................................... 307/44

(58) Field of Classification Search .................... 307/44, 307/45, 46, 64, 66
See application file for complete search history.

(56) References Cited

U.S. PATENT DOCUMENTS

| | | | |
|---|---|---|---|
| 4,742,291 A | 5/1988 | Bobier | |
| 5,086,267 A | 2/1992 | Janda | |
| 5,248,349 A | 9/1993 | Foote et al. | |
| 5,372,646 A | 12/1994 | Foote et al. | |
| 5,470,397 A | 11/1995 | Foote et al. | |
| 5,536,333 A | 7/1996 | Foote et al. | |
| 5,945,163 A | 8/1999 | Powell et al. | |
| 6,037,241 A | 3/2000 | Powell et al. | |
| 6,037,758 A | 3/2000 | Perez | |
| 6,444,043 B1 | 9/2002 | Gegenwart et al. | |
| 2003/0047209 A1* | 3/2003 | Yanai et al. | 136/291 |
| 2004/0125618 A1* | 7/2004 | De Rooij et al. | 363/17 |
| 2005/0257824 A1 | 11/2005 | Maltby et al. | |
| 2007/0001461 A1 | 1/2007 | Hopewell | |
| 2008/0128020 A1 | 6/2008 | Zafar et al. | |
| 2008/0212343 A1 | 9/2008 | Lasseter et al. | |
| 2008/0272279 A1 | 11/2008 | Thompson | |

FOREIGN PATENT DOCUMENTS

| | | |
|---|---|---|
| JP | 03-155340 | 7/1991 |
| JP | 2003-158825 | 5/2003 |

OTHER PUBLICATIONS

PCT Search Report, International Application No. PCT/US2010/024240, mailed Jul. 19, 2010.
International Preliminary Report on Patentability and Written Opinion issued in PCT/US2010/024240, dated Aug. 16, 2011.

\* cited by examiner

*Primary Examiner* — Jared Fureman
*Assistant Examiner* — Carlos Amaya
(74) *Attorney, Agent, or Firm* — Dickstein Shapiro LLP

(57) ABSTRACT

A method and system for reducing power output rate change variability. A photovoltaic power output is received from a photovoltaic array. The rate of change of the photovoltaic power output is measured. An auxiliary power source output is adjusted to limit a plant power output rate of change to within a power output rate change band when combined with the photovoltaic power.

52 Claims, 7 Drawing Sheets

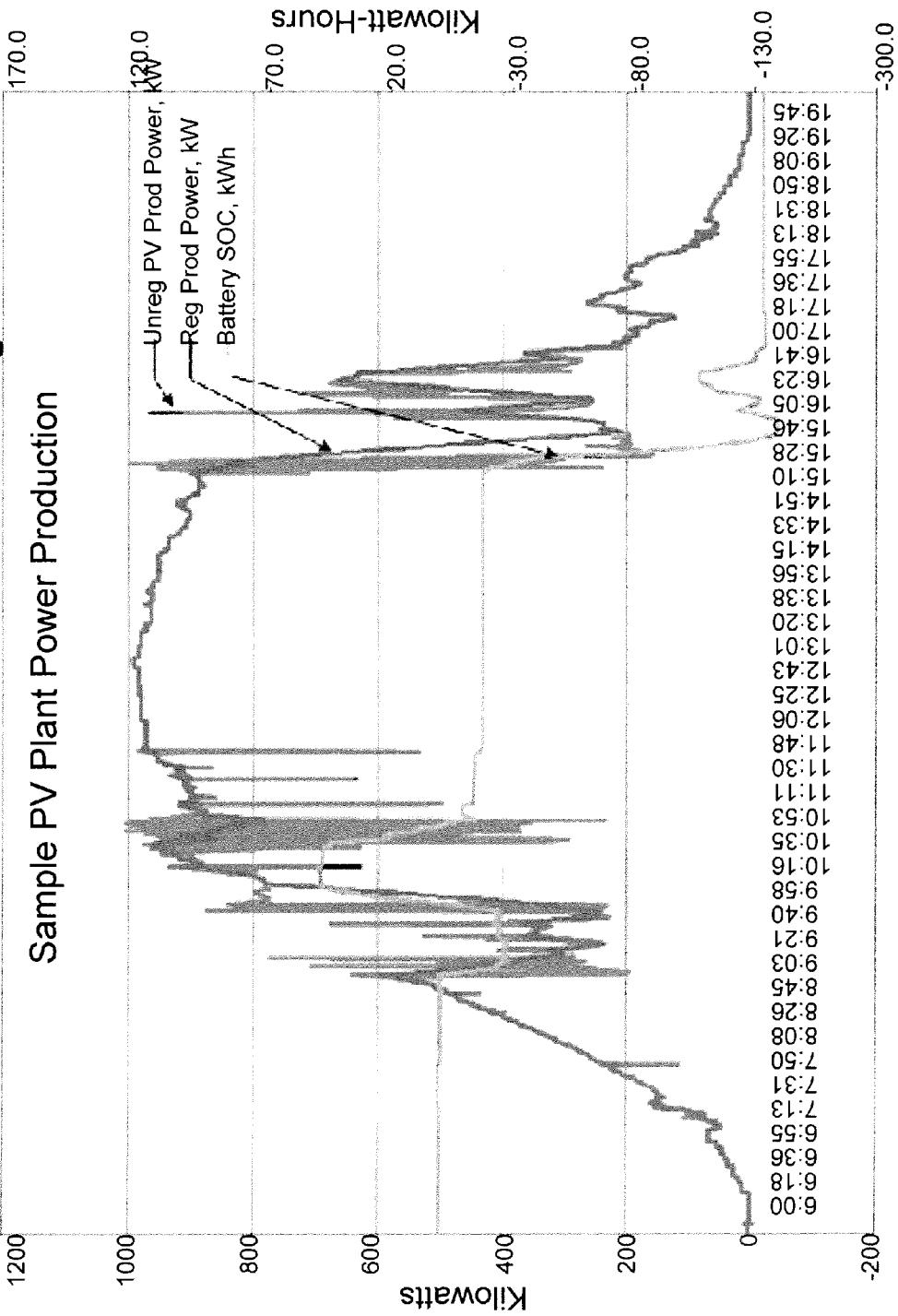

PHOTOVOLTAIC POWER PLANT OUTPUT

CLAIM FOR PRIORITY

This application claims priority under 35 U.S.C. §119(e) to Provisional U.S. Patent Application Ser. No. 61/152,345 filed on Feb. 13, 2009, and is a continuation of Application No. PCT/US10/24240, filed Feb. 15, 2010, each of which is incorporated by reference in its entirety.

TECHNICAL FIELD

This invention relates to photovoltaic power plant output.

BACKGROUND

Photovoltaic power plants are becoming practical as grid scale generation facilities capable of producing tens of megawatts, decreasing the cost of photovoltaic modules. Larger plants are being built to satisfy mandates for renewable energy capacity. Penetration levels of photovoltaic plants are expected to be significant. Photovoltaic plants may produce short term, rapidly changing (e.g. as much as 100% of rated power per minute or 200% of rated power per minute) variable output power that may be due to shading caused by isolated moving clouds. For this reason, energy producers and grid operators may consider large photovoltaic power plants (i.e. larger than 2 MW) to be unpredictable.

Stability, reliability, and power quality of the electric grid, which may be negatively affected by large photovoltaic power plant variability, is controlled by allocating reserve generation capacity for load following, spinning reserve, voltage support, and frequency regulation with hydro, steam, and combustion turbine generators that can respond relatively faster than base load power generation plants such as coal and nuclear type plants. Reserve generation resources may not have the response characteristics needed to account for short term variability of large solar photovoltaics.

Reducing short term variability of large solar photovoltaics would reduce the need for reserve generation. Large photovoltaic plants connected at utility grid distribution level (69 kV and less), may introduce voltage deviations and flicker depending upon the capacity and impedance of the network or feeder. Reducing short term variability would reduce voltage effects and/or permit voltage regulation devices to react.

DESCRIPTION OF DRAWINGS

FIG. 7 is an illustration graph of photovoltaic plant power output with high rate of change control.

DETAILED DESCRIPTION

Figure 1:
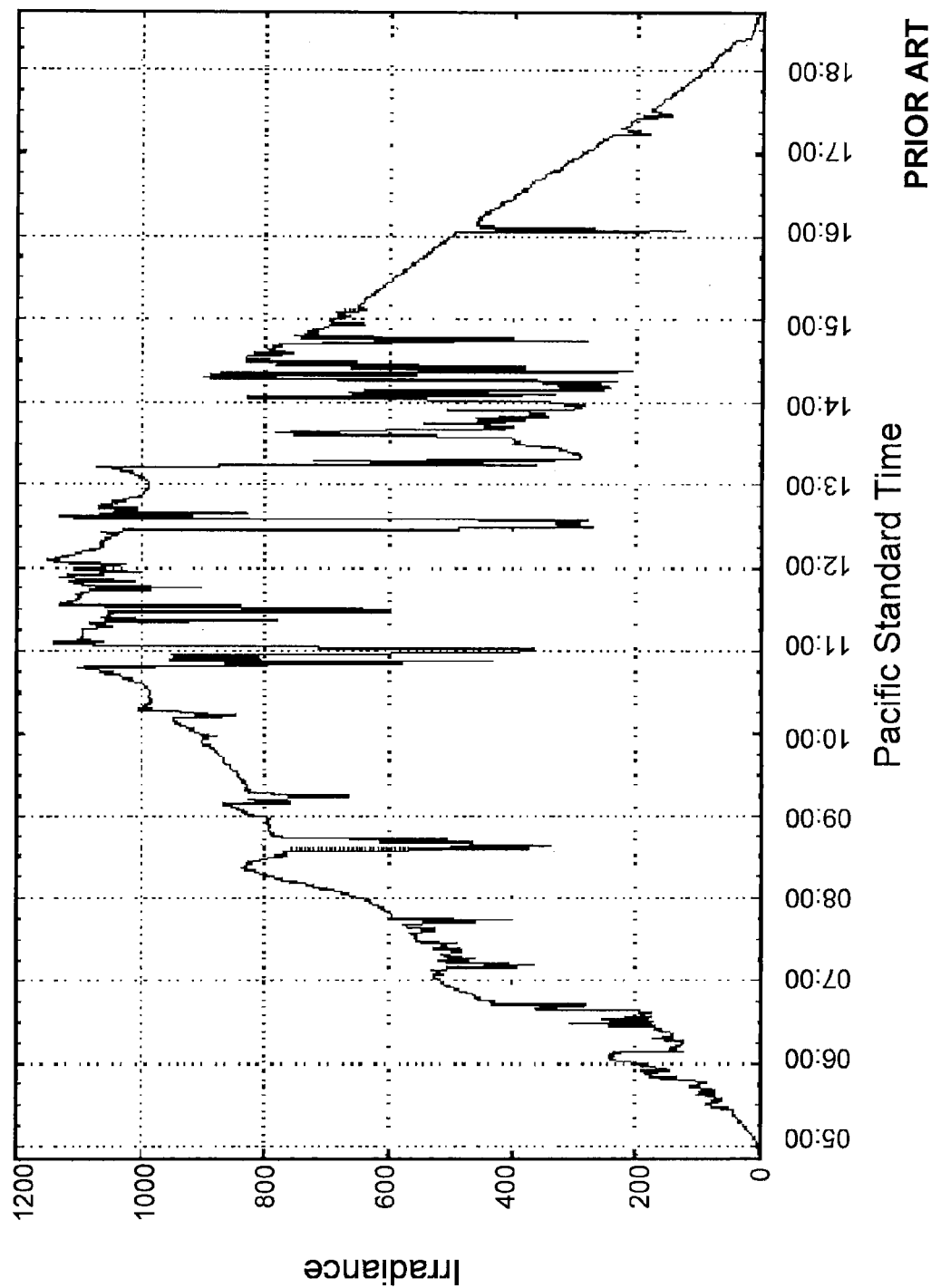
FIG. 1 is a graph of global irradiance.

Solar energy plants under favorable weather and cloud conditions tend to be predictable in that energy production coincides with daily solar cycles, fairly close to daily peak demand profile. Photovoltaic solar energy, however, is subject to short term variability when isolated cumulus clouds pass over the photovoltaic array, reducing or eliminating the direct incident component of solar radiation. Clouds have a widely variable effect, from a 10 or 15% reduction from thin cirrus clouds, to a 50-70% reduction from dense cumulus clouds (thunderheads). During cloud passage, the photovoltaic array may produce power only from the diffuse component of solar radiation. FIG. 1 showing global irradiance illustrates the relatively fast changes in solar radiation that are possible. A photovoltaic plant power output profile is very similar to the global irradiance profile shown in FIG. 1.

Short-term variability of sufficiently large, multi-megawatt photovoltaic power plants can have negative effects on transmission grid stability, requiring large amounts of regulation and spinning reserve resources to be allocated to account for sudden and large changes in photovoltaic plant output. Additionally, photovoltaic plants connected to distribution networks can cause load flow, voltage flicker, and voltage regulation problems for loads on the network and may cause conditions that could trip network protective devices.

Short term variability can be reduced by including an auxiliary power source as part of the photovoltaic plant. The auxiliary power source may be a stored energy system such as an electrolytic cell type device such as a capacitor battery (e.g. lead-acid, nickel-cadmium, sodium, or lithium-ion battery), or flow battery, as is known in the art. The auxiliary power source may also be an alternative generation device such as a fuel cell or generator driven by flywheel and/or prime mover fueled by a gas or liquid and/or compressed air. The auxiliary power source may be a system comprised of two or more of the types previously described. The auxiliary power source can have the capability of responding to power control signals within seconds and be capable of changing power level at a rate of greater than 100% of photovoltaic power plant rating per minute or greater than 200% of photovoltaic power plant rating per minute.

This arrangement can control the rate of change of photovoltaic plant output power to emulate the more slowly responding characteristics of thermal power plants, e.g., steam or combustion turbine generation. A less variable photovoltaic plant output assures efficient and stable response to short term solar variability by all available grid generation resources. The configuration of the photovoltaic plant for controlling photovoltaic power plant output rate of change, also referred to as ramp rate, is illustrated as shown in the Figures and described below.

In general, a method for generating less variable output power from a large, grid connected photovoltaic plant can include receiving photovoltaic power from a photovoltaic array, measuring the rate of change of photovoltaic power, and adjusting power from a controllable auxiliary power source and the photovoltaic power converter, where the output power of combined photovoltaic power and auxiliary power source is set to operate within a given power output rate change band which defines the maximum allowable positive and negative limits for the plant output power rate of change.

Adjusting auxiliary power can include adjusting an auxiliary power source having the power and energy capacity and dynamic response appropriate for the system configuration and modes of operation as described herein. Since the potential power output rate of change of a photovoltaic plant can be relatively rapid, the auxiliary source can have the capability to respond faster. The auxiliary power can be a continuously available utility supplied energy source. The auxiliary power can be a high rate rechargeable source with significantly limited energy storage. The auxiliary power can be a low rate rechargeable auxiliary power source with significantly large energy storage. Energy storage systems may include mechanical and/or electrical devices for converting and storing energy. The stored energy system can be, but is not limited to, one of an electrolytic cell device, an electrochemical cell device, or a mechanical kinetic and/or potential energy storage device. The stored energy system can include, but is not limited to, an electrolytic cell device, a capacitor, a lead-acid battery, a nickel-cadmium battery, a sodium battery, a lithium-ion battery, a flow battery, or a mechanical kinetic and/or potential energy storage device. The auxiliary power can be an alternative generation device. The alternative generation device can be, but is not limited to, one of a fuel cell, a wind turbine generator, a flywheel generator, a gas fueled combustion prime mover-generator, a liquid fueled prime mover-generator, a compressed-gas powered prime mover-generator, or combinations thereof, including an air-powered prime mover-generator. Adjusting the auxiliary power can include adjusting a stored energy system or an alternative generation device or adjusting the amount of stored energy in the stored energy system to maintain the plant output power rate of change to within the positive and negative power rate change limits. Adjusting the auxiliary power can include adjusting the optimum combination of multiple energy storage device types, multiple power generation device types, or multiple energy storage and power generation devices.

Adjusting the auxiliary power can include adjusting a source that is continuously available. The auxiliary power can be a utility supplied energy source. The auxiliary power can be a source with significantly limited energy source or a high rate rechargeable source. Adjusting the auxiliary power can include adjusting a stored energy system or an alternative generation device. The stored energy system can be, but is not limited to, one of an electrolytic cell device, a capacitor, a lead-acid battery, a nickel-cadmium battery, a sodium battery, a lithium-ion battery, a flow battery, or a mechanical kinetic and/or potential energy storage device. Energy storage and alternative generation systems may include mechanical and/or electrical devices for converting and storing energy. The alternative generation device can be, but is not limited to, one of a fuel cell, a wind turbine generator, a flywheel generator, a gas fueled prime mover-generator, a liquid fueled prime mover-generator, or a compressed-air powered prime mover-generator.

If the auxiliary power source is a stored energy system, the method can include increasing an amount of stored energy in the auxiliary power source when the photovoltaic output power rate of change exceeds the positive limit of the power output rate change band. The method can include decreasing photovoltaic power when the photovoltaic output power rate of change exceeds the positive limit of the power output rate change band. The method can include maintaining a constant amount of stored energy in the auxiliary power source when the photovoltaic output power rate of change is within the allowable power output rate change band. The method can include decreasing an amount of stored energy in the auxiliary power source when the photovoltaic output power rate of change exceeds the negative limit of the power output rate change band. The method can include establishing secondary positive and negative power rate change limits which have a tighter tolerance than the normal power rate change limits. The method can include establishing one or more set points defining the upper and lower capacity limits of the stored energy in the auxiliary power source used to determine the transition from the normal to the secondary power rate change limits. The method can include setting upper and lower capacity hysteresis limits of the stored energy in the auxiliary power source used to determine the transition from the secondary to the normal power rate change limits. The method can include switching to the secondary positive power rate change limit when the level of stored energy falls below the lower capacity limit to facilitate faster charging of the auxiliary power source when the output power rate of change is positive. The method can include returning to the normal positive power rate change limit when the level of stored energy in the auxiliary power source rises above the lower capacity hysteresis limit. The method can include switching to the secondary negative power rate change limit when the level of stored energy rises above the upper capacity limit to facilitate faster discharging of the auxiliary power source when the output power rate of change is negative. The method can include returning to the normal negative power rate change limit when the level of stored energy in the auxiliary power source falls below the upper capacity hysteresis limit.

The method can include operation of the plant to dispatch plant output power following a dispatch set point. The method can include establishing a dispatch set point that is constant. The method can include establishing a dispatch set point derived from a schedule consisting of a series of different points. The method can include increasing the level of stored energy in the auxiliary power source when the photovoltaic output power is greater than the dispatch set point. The method can include decreasing the level of stored energy in the auxiliary power source when the photovoltaic output power is less than the dispatch set point. The method can include limiting the rate of change of the combined photovoltaic power and auxiliary power source to operate within the power output rate change band when the dispatch set point is changed.

If the auxiliary power source is an alternative power device, the method can include maintaining constant auxiliary power when the photovoltaic output power rate of change is within the allowable power output rate change band. The method can include reducing auxiliary power when the photovoltaic output power rate of change exceeds the positive limit of the power output rate change band. The method can include increasing auxiliary power when the photovoltaic output power rate of change exceeds the negative limit of the power output rate change band. The method can include decreasing photovoltaic power when the photovoltaic output power rate of change exceeds the positive limit of the power output rate change band. The method can include maintaining plant output power at a constant level if photovoltaic output power increases or decreases.

The method can further include inertial set points to suppress the rate of plant output power rate of change when transitioning to a different power rate change condition including a negative power rate change to a positive power rate change condition or transitioning from a positive power rate change to negative power rate change condition. The method can further include using the plant irradiance measurement as an anticipatory indicator in determining when a change in the power output rate change should be made and the approximate new value of the power rate change limits. The method can further include slowing or reducing the plant output rate of change when the plant measured irradiance value reaches a relatively stable minimum or maximum value. The method can further include adjusting the rate at which stored energy is increased in the stored energy system, up to the allowable positive power rate change limit, if the irradiance measurement is increasing. The method can further include adjusting the rate at which stored energy is decreased in the stored energy system, up to the allowable negative power rate change limit, if the irradiance measurement is decreasing. The method can further include adjusting the rate at which auxiliary power is decreased, up to the allowable positive power rate change limit, if the irradiance measurement is increasing. The method can further include adjusting the rate at which auxiliary power is increased, up to the allowable negative power rate change limit, if the irradiance measurement is decreasing.

The method can further include establishing plant operation to follow an energy/power schedule based on a solar energy production forecast or operation of the plant to follow a predetermined energy/power schedule determined by solar energy production forecasting techniques. The energy/power forecast schedule may predict the energy and average power expected from the plant for each hour of production. The method can further include an upper power forecast limit and a lower power forecast limit based on the average forecasted power within an hour period. The method can further include decreasing or increasing the auxiliary power or the level of stored energy in the stored energy system to maintain the plant output rate of change within the plant output rate change band if the plant output power is within the upper and lower power forecast limits. The method can further include decreasing the level of stored energy in the stored energy system to maintain constant plant output power if the plant output power approaches the lower power forecast limit. The method can further include increasing the level of stored energy in the stored energy system to maintain constant plant output power if the plant output power approaches the upper power forecast limit. The method can further include increasing the auxiliary power to maintain constant plant output power if the plant output power approaches the lower power forecast limit. The method can further include decreasing the auxiliary power to maintain constant plant output power if the plant output power approaches the upper power forecast limit. The method can further include limiting the rate of change of the combined photovoltaic and auxiliary power source to operate within the power output rate change band when transitioning from one scheduled hour to the next scheduled hour. The method can further include adjusting auxiliary power or the level of stored energy in the stored energy system to control the plant output to minimize any revenue penalties due to the net energy deviation from scheduled based on predetermined criteria associated with utility rate structures and tariffs.

The method can include adjusting auxiliary power or the level of stored energy to compensate for changes in cloud cover or anticipated changes in cloud cover. The method can include increasing auxiliary power or the level of stored energy when cloud cover is forecast or physically detected. The method can include adjusting auxiliary power or the level of stored energy in the absence of cloud cover. The method can include reducing auxiliary power or the level of stored energy when no cloud cover is forecast or physically detected. The method can include adjusting auxiliary power or the level of stored energy for grid frequency regulation, ancillary services, or load shifting while producing less variable output from a large, grid connected photovoltaic plant.

A system for generating less variable output power can include receiving a photovoltaic array, an inverter connected to the photovoltaic array; and an auxiliary power source, connected by a direct current converter to the inverter, where the inverter produces alternating current output power to a grid. The system can include a plant control system controlling the inverter and auxiliary power source, measuring the rate of change of power from the photovoltaic array, and adjusting auxiliary power output. The system can include the output power of the combined photovoltaic array and auxiliary power source set to operate within a given power output rate change band which defines the maximum allowable plant output power rate of change, positive of negative. The system can include separate and independently adjustable set points for positive and negative power rate change limits. The system can include power rate change limits that are continuously adjustable between 0% (zero) and 100%, positive and negative. The system can include set points that can be pre-set and then automatically changed by the plant control system in response to time of day; current, scheduled, or anticipated photovoltaic plant operating conditions; or current or anticipated weather conditions.

The system can include the auxiliary power source being a source that is continuously available. The auxiliary power source can be a utility supplied energy source. The auxiliary power source can be a source with significantly limited energy source or a high rate rechargeable source. The system can include the auxiliary power source being at least one of a stored energy system and an alternative generation device. The stored energy system can be one of an electrolytic cell device, a capacitor, a lead-acid battery, a nickel-cadmium battery, a sodium battery, a lithium-ion battery, a flow battery, or a mechanical kinetic and/or potential energy storage device. The alternative generation device can be one of a fuel cell, a wind turbine generator, a flywheel generator, a gas fueled prime mover, a liquid fueled prime mover, or a compressed-air powered prime mover.

The system can include the auxiliary power being a source having the power and energy capacity and dynamic response appropriate for the system configuration and modes of operation as described herein. Since the potential power output rate of change of a photovoltaic plant can be relatively rapid, the auxiliary source can have the capability to respond faster. The auxiliary power can be a continuously available utility supplied energy source. The auxiliary power can be a high rate rechargeable source with significantly limited energy storage. The auxiliary power can be a low rate rechargeable auxiliary power source with significantly large energy storage. Energy storage systems may include mechanical and/or electrical devices for converting and storing energy. The stored energy system can be, but is not limited to, one of an electrolytic cell device, a capacitor, a lead-acid battery, a nickel-cadmium battery, a sodium battery, a lithium-ion battery, a flow battery, or a mechanical kinetic and/or potential energy storage device. The auxiliary power can be an alternative generation device. The alternative generation device can be, but is not limited to, one of a fuel cell, a wind turbine generator, a flywheel generator, a gas fueled combustion prime mover-generator, a liquid fueled prime mover-generator, a compressed-gas powered prime mover-generator, or combinations thereof, including an air-powered prime mover-generator.

The system can include the auxiliary power being at least one of a stored energy system and an alternative generation device. This system can include the optimum combination of multiple energy storage device types, multiple power generation device types, or multiple energy storage and power generation devices.

The system can include an auxiliary power source comprising of an energy storage system. The plant control system can increase the level of stored energy in the auxiliary power source when the photovoltaic output power rate of change exceeds the positive limit of the power output rate change band. The system can decrease photovoltaic power when the photovoltaic output power rate of change exceeds the positive limit of the power output rate change band. The plant control system can maintain a constant level of stored energy in the auxiliary power source when the photovoltaic output power rate of change is within the positive and negative limits of the power output rate change band. The plant control system can decrease the level of stored energy in the auxiliary power source when the photovoltaic output power rate of change is below the negative limit of the output power rate change band. The system can include secondary positive and negative power rate change limits which have a tighter tolerance than the normal power rate change limits. The system can include set points defining the upper and lower capacity limits of the stored energy in the auxiliary power source used to determine the transition from the normal to the secondary power rate change limits. The system can include upper and lower capacity hysteresis limits of the stored energy in the auxiliary power source used to determine the transition from the secondary to the normal power rate change limits. The plant control system can switch to the secondary positive power rate change limit when the level of stored energy falls below the lower capacity limit to facilitate faster charging of the auxiliary power source when the output power rate of change is positive. The plant control system can return to the normal positive power rate change limit when the level of stored energy in the auxiliary power source rises above the lower capacity hysteresis limit. The plant control system can switch to the secondary negative power rate change limit when the level of stored energy rises above the upper capacity limit to facilitate faster discharging of the auxiliary power source when the output power rate of change is negative. The plant control system can return to the normal negative power rate change limit when the level of stored energy in the auxiliary power source falls below the upper capacity hysteresis limit.

The system can include a plant control system controlling the output power of the combined photovoltaic array and auxiliary power source to operate at a constant power level. The system can include separate and independently adjustable set points for positive and negative power rate change limits. The system can include set points limiting the plant power output rate of change that are continuously adjustable between 0% (zero) and 100%, positive and negative. The plant control system can operate the plant to maintain a constant dispatch set point. The system can operate the plant to maintain a dispatch set point that is constant. The system can operate the plant to follow a schedule consisting of a series of different dispatch set points. The system can increase the level of stored energy in the auxiliary power source when the photovoltaic plant output is greater than the dispatch set point. The system can lower the level of stored energy in the auxiliary power source when the photovoltaic plant output is less than the dispatch set point. The system can limit the rate of change of the combined photovoltaic power and auxiliary power source to operate within the power output rate change band when the dispatch set point is changed.

The system can include an auxiliary power source comprising of a power generation device. The plant control system can reduce the power output from the auxiliary power source when the photovoltaic power rate of change exceeds the positive limit of the power output rate change band. The plant control system can maintain a constant power output from the auxiliary power source when the photovoltaic power rate of change is within the positive and negative limits of the power output rate change band. The plant control system can increase the power output from the auxiliary power source when the photovoltaic power rate of change is below the negative limit of the power output rate change band. The plant control system can decrease photovoltaic power when a photovoltaic output power rate of change exceeds a positive limit of the power output rate change band. The plant control system can maintain output power at a constant level if photovoltaic power increases or decreases. This system can include the combination of multiple energy storage devices, multiple power generation devices, or multiple energy storage and power generation devices.

The plant control system can further include inertial set points to suppress the rate of plant output power rate of change when transitioning to a different power rate change condition including a negative power rate change to a positive power rate change condition or transitioning from a positive power rate change to negative power rate change condition. The system can further include using the plant irradiance measurement as an anticipatory indicator in determining when a change in the power output rate change should be made and the approximate new value of the power rate change limits. The system can further include slowing or reducing the plant output rate of change when the plant measured irradiance value reaches a relatively stable minimum or maximum value. The system can further include adjusting the rate at which stored energy is increased in the stored energy system, up to the allowable positive power rate change limit, if the irradiance measurement is increasing. The system can further include adjusting the rate at which stored energy is decreased in the stored energy system, up to the allowable negative power rate change limit, if the irradiance measurement is decreasing. The system can further include adjusting the rate at which auxiliary power is decreased, up to the allowable positive power rate change limit, if the irradiance measurement is increasing. The system can further include adjusting the rate at which auxiliary power is increased, up to the allowable negative power rate change limit, if the irradiance measurement is decreasing.

The plant control system can further include operation of the plant to follow a predetermined energy/power schedule determined by solar energy production forecasting techniques. The energy/power forecast schedule may predict the energy and average power expected from the plant for each hour of production. The system can further include an upper power forecast limit and a lower power forecast limit based on the average forecasted power within an hour period. The system can further include decreasing or increasing the auxiliary power or the level of stored energy in the stored energy system to maintain the plant output rate of change within the power output rate change band if the plant output power is within the upper and lower power forecast limits. The system can further include decreasing the level of stored energy in the stored energy system to maintain constant plant output power if the plant output power approaches the lower power forecast limit. The system can further include increasing the level of stored energy in the stored energy system to maintain constant plant output power if the plant output power approaches the upper power forecast limit. The system can further include increasing the auxiliary power to maintain constant plant output power if the plant output power approaches the lower power forecast limit. The system can further include decreasing the level of stored energy in the stored energy system to maintain constant plant output power if the plant output power approaches the upper power forecast limit. The system can further include limiting the rate of change of the combined photovoltaic and auxiliary power source to operate within the power output rate change band when transitioning from one scheduled hour to the next scheduled hour. The plant control system can further include adjusting auxiliary power or the level of stored energy in the stored energy system to control the plant output to minimize any revenue penalties due to the net energy deviation from scheduled based on predetermined criteria associated with utility rate structures and tariffs.

The plant control system can adjust auxiliary power or the level of stored energy in anticipation of and to compensate for cloud cover. The plant control system can increase auxiliary power or the level of stored energy when cloud cover is forecast or physically detected. The plant control system can adjust auxiliary power or the level of stored energy in the absence of cloud cover. The plant control system can reduce auxiliary power or the level of stored energy when no cloud cover is forecast or physically detected. The plant control system can adjust auxiliary power or a level of stored energy for grid frequency regulation, ancillary services, or load shifting.

A system for generating less variable output power can include receiving a photovoltaic array, an inverter connected to the photovoltaic array; and an auxiliary power source, where the auxiliary power source produces alternating current output power to a grid. The system can include a plant control system controlling the inverter and auxiliary power source, measuring the rate of change of power from the photovoltaic array, and adjusting auxiliary power output. The system can include the output power of the combined photovoltaic power plant and auxiliary power plant set to operate within a given power output rate change band which defines the maximum allowable plant output power rate of change, positive or negative. The system can include separate and independently adjustable set points for positive and negative power rate change limits. The system can include power rate change limits that are continuously adjustable between 0% (zero) and 100%, positive and negative. The system can include set points that can be pre-set and then automatically changed by the plant control system in response to time of day; current, scheduled or anticipated photovoltaic plant operating conditions; and current or anticipated weather conditions.

The system can include the auxiliary power source being a source that is continuously available. The auxiliary power source can be a utility supplied energy source. The auxiliary power source can be a source with significantly limited energy source or a high rate rechargeable source. The system can include the auxiliary power source being at least one of a stored energy system and an alternative generation device. The stored energy system can be one of an electrolytic cell device, a capacitor, a lead-acid battery, a nickel-cadmium battery, a sodium battery, a lithium-ion battery, a flow battery, or a mechanical kinetic and/or potential energy storage device. The alternative generation device can be one of a fuel cell, a wind turbine generator, a flywheel generator, a gas fueled prime mover, a liquid fueled prime mover, or a compressed-air powered prime mover.

The system can include the auxiliary power being a source having the power and energy capacity and dynamic response appropriate for the system configuration and modes of operation as described herein. Since the potential power output rate of change of a photovoltaic plant can be relatively rapid, the auxiliary source can have the capability to respond faster. The auxiliary power can be a continuously available utility supplied energy source. The auxiliary power can be a high rate rechargeable source with significantly limited energy storage. The auxiliary power can be a low rate rechargeable auxiliary power source with significantly large energy storage. Energy storage systems may include mechanical and/or electrical devices for converting and storing energy. The stored energy system can be, but is not limited to, one of an electrolytic cell device a capacitor, a lead-acid battery, a nickel-cadmium battery, a sodium battery, a lithium-ion battery, a flow battery, or a mechanical kinetic and/or potential energy storage device. The auxiliary power can be an alternative generation device. The alternative generation device can be, but is not limited to, one of a fuel cell, a wind turbine generator, a flywheel generator, a gas fueled combustion prime mover-generator, a liquid fueled prime mover-generator, a compressed-gas powered prime mover-generator, or combinations thereof, including an air-powered prime mover-generator. The system can include the auxiliary power being at least one of a stored energy system and an alternative generation device. This system can include the optimum combination of multiple energy storage device types, multiple power generation device types, or multiple energy storage and power generation devices.

The system can include an auxiliary power source comprising of an energy storage system. The plant control system can increase the level of stored energy in the auxiliary power source when the photovoltaic output power rate of change exceeds the positive limit of the power output rate change band. The system can decrease photovoltaic power when the photovoltaic output power rate of change exceeds the positive limit of the power output rate change band. The plant control system can maintain a constant level of stored energy in the auxiliary power source when the photovoltaic output power rate of change is within the positive and negative limits of the power output rate change band. The plant control system can decrease the level of stored energy in the auxiliary power source when the photovoltaic output power rate of change is below the negative limit of the power output rate change band. The system can include secondary positive and negative power rate change limits which have a tighter tolerance than the normal power rate change limits. The system can include set points defining the upper and lower capacity limits of the stored energy in the auxiliary power source used to determine the transition from the normal to the secondary power rate change limits. The system can include upper and lower capacity hysteresis limits of the stored energy in the auxiliary power source used to determine the transition from the secondary to the normal power rate change limits. The plant control system can switch to the secondary positive power rate change limit when the level of stored energy falls below the lower capacity limit to facilitate faster charging of the auxiliary power source when the output power rate of change is positive. The plant control system can return to the normal positive power rate change limit when the level of stored energy in the auxiliary power source rises above the lower capacity hysteresis limit. The plant control system can switch to the secondary negative power rate change limit when the level of stored energy rises above the upper capacity limit to facilitate faster discharging of the auxiliary power source when the output power rate of change is negative. The plant control system can return to the normal negative power change rate limit when the level of stored energy in the auxiliary power source falls below the upper capacity hysteresis limit.

The system can include a plant control system controlling the plant output power of the combined photovoltaic array plant and auxiliary power source to operate at a constant power level. The system can include separate and independently adjustable set points for positive and negative power rate change limits. The system can include set points limiting the plant power rate change that are continuously adjustable between 0% (zero) and 100%, positive and negative. The plant control system can operate the plant to maintain constant power equal to a dispatch set point. The system can operate the plant to maintain a constant dispatch set point. The system can operate the plant to follow a schedule consisting of a series of different dispatch set points. The system can increase the level of stored energy in the auxiliary power source when the photovoltaic plant output is greater than the dispatch set point. The system can lower the level of stored energy in the auxiliary power source when the photovoltaic plant output is less than the dispatch set point. The system can limit the rate of change of the combined photovoltaic power and auxiliary power source to operate within the power output rate change band when the dispatch set point is changed.

The system can include an auxiliary power source comprising of a power generation device. The plant control system can reduce the power output from the auxiliary power source when the photovoltaic power rate of change exceeds the positive limit of the power output rate change band. The plant control system can maintain a constant power output from the auxiliary power source when the photovoltaic power rate of change is within the positive and negative limits of the power output rate change band. The plant control system can increase the power output from the auxiliary power source when the photovoltaic power rate of change is below the negative limit of the power output rate change band. The plant control system can decrease photovoltaic power when a photovoltaic output power rate of change exceeds a positive limit of the power output rate change band. The plant control system can maintain output power at a constant level if photovoltaic power increases or decreases. This system can include the combination of multiple energy storage devices, multiple power generation devices, or multiple energy storage and power generation devices.

The plant control system can further include inertial set points to suppress the rate of plant output power rate of change when transitioning to a different power rate change condition including a negative power rate change to a positive power rate change condition or transitioning from a positive power rate change to negative power rate change condition. The system can further include using the plant irradiance measurement as an anticipatory indicator in determining when a change in the power output rate change should be made and the approximate new value of the power rate change limits. The system can further include slowing or reducing the plant output rate of change when the plant measured irradiance value reaches a relatively stable minimum or maximum value. The system can further include adjusting the rate at which stored energy is increased in the stored energy system, up to the allowable positive power rate change limit, if the irradiance measurement is increasing. The system can further include adjusting the rate at which stored energy is decreased in the stored energy system, up to the allowable negative power rate change limit, if the irradiance measurement is decreasing. The system can further include adjusting the rate at which auxiliary power is decreased, up to the allowable positive power rate change limit, if the irradiance measurement is increasing. The system can further include adjusting the rate at which auxiliary power is increased, up to the allowable negative power rate change limit, if the irradiance measurement is decreasing.

The plant control system can further include operation of the plant to follow a predetermined energy/power schedule determined by solar energy production forecasting techniques. The energy/power forecast schedule may predict the energy and average power expected from the plant for each hour of production. The system can further include an upper power forecast limit and a lower power forecast limit based on the average forecasted power within an hour period. The system can further include decreasing or increasing the auxiliary power or the level of stored energy in the stored energy system to maintain the plant output rate of change within the power output rate change band if the plant output power is within the upper and lower power forecast limits. The system can further include decreasing the level of stored energy in the stored energy system to maintain constant plant output power if the plant output power approaches the lower power forecast limit. The system can further include increasing the level of stored energy in the stored energy system to maintain constant plant output power if the plant output power approaches the upper power forecast limit. The system can further include increasing the auxiliary power to maintain constant plant output power if the plant output power approaches the lower power forecast limit. The system can further include decreasing the level of stored energy in the stored energy system to maintain constant plant output power if the plant output power approaches the upper power forecast limit. The system can further include limiting the rate of change of the combined photovoltaic and auxiliary power source to operate within the power output rate change band when transitioning from one scheduled hour to the next scheduled hour. The plant control system can further include adjusting auxiliary power or the level of stored energy in the stored energy system to control the plant output to minimize any revenue penalties due to the net energy deviation from scheduled based on predetermined criteria associated with utility rate structures and tariffs.

The plant control system can adjust auxiliary power or the level of stored energy in anticipation of and to compensate for changing cloud cover. The plant control system can increase auxiliary power or the level of stored energy when cloud cover is forecast or physically detected. The plant control system can adjust auxiliary power or the level of stored energy in the absence of cloud cover. The plant control system can reduce auxiliary power or the level of stored energy when no cloud cover is forecast or physically detected. The plant control system can adjust auxiliary power or the level of stored energy for grid frequency regulation, ancillary services, or peak load shifting while producing less variable output from a large, grid connected photovoltaic plant.

The auxiliary power source can be various types ranging from a source that is continuously available with a utility supplied energy source to a source with significantly limited energy source including high rate rechargeable sources. Since the potential power output rate of change of a photovoltaic plant can be relatively rapid, the auxiliary source can have the capability to respond faster.

Figure 2:
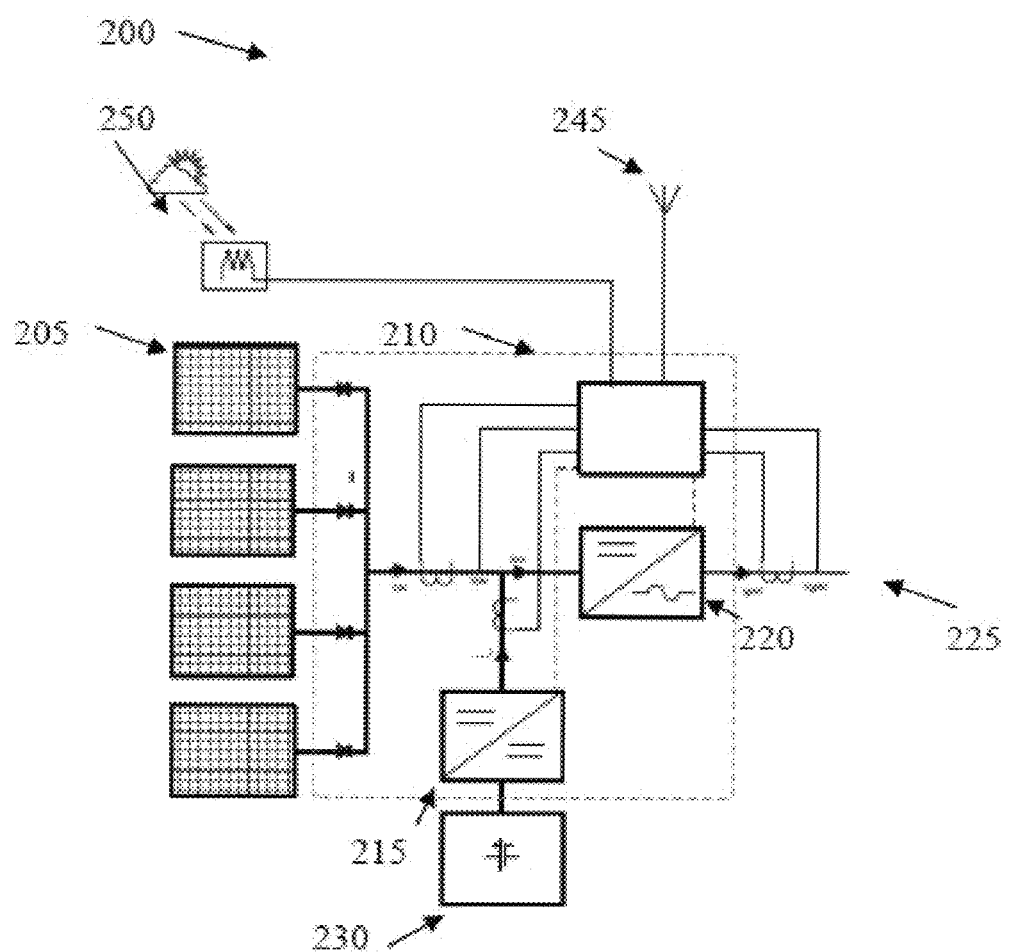
FIG. 2 is a schematic of a photovoltaic power plant with a DC connected battery.

Referring now to FIG. 2, the system has a defined algorithm. As shown in FIG. 2, the system 200 includes photovoltaic arrays 205 connected to a plant control system 210. The plant control system 210 includes a DC/DC converter 215 and an inverter 220. The photovoltaic arrays 205 are connected to the inverter 220 and then to the grid 225. Additionally, a battery 230 is connected to the DC/DC converter 215. The battery 230, as the auxiliary power source, is used to reduce the variability of the photovoltaic power plant output. The battery 230 may be one of the stored energy devices previously described. The battery 230 is normally maintained at approximately 50% state of charge. Normally, the inverter 220, operating to control the maximum power point of the photovoltaic array 205, delivers power from the photovoltaic array 205 to the grid 225 based on the available irradiance. The power level increases and decreases continuously over the course of a day as available sunlight changes. The normal absolute value (ABS) rate of change over a day is less than 0.5% of peak rated power per minute.

When solar variability causes the rate of change in photovoltaic plant output power to exceed the limits of a normal power output rate change band, e.g., faster than 3% per minute, positive or negative, the photovoltaic plant control system 210 controls the DC/DC converter 215 to either supply current from or to the battery 230 to control the current into the inverter 220 to maintain the change in power delivered to the grid 225 within the normal positive and negative limits of the power output rate change band. The power output rate change band is defined by separate and independently changeable positive and negative power rate change limits. The negative power rate change limit may be any value between 0 and −100% per minute. The positive power rate change limit may be any value between and 0 and +100% per minute. The power rate change limits may be pre-set by the user and may be automatically adjusted by the plant control system 210 based on local variability limitations, current or scheduled plant operating conditions, time of day, or current or forecasted weather conditions. Other user-defined pre-sets are included to set boundaries on power levels, stored energy control, and auxiliary power source operation, as explained herein. For instance, when photovoltaic power output decreases at a rate faster than the negative power rate change limit, energy stored in the battery 230 is discharged by controlling the DC/DC converter current to flow from the battery 230 to the inverter 220. This action adds the battery current to the photovoltaic current, providing sufficient current to the inverter 220, reducing the rate of change of the plant output power to be equal to the negative power rate change limit. In this mode, the battery 230 is discharged and energy is lost. The photovoltaic plant control system 210 continuously monitors grid output power and adjusts the DC/DC converter current level and direction, when necessary, so that grid output power is within the positive and negative limits of the power output rate change band. When the photovoltaic output rate of change is within the positive and negative limits of the power rate change band, the DC/DC converter current is reduced ultimately to zero. Similarly, if the photovoltaic power output increases at a rate faster than the positive power rate change limit, a portion of the current from the photovoltaic array 205 is delivered to the battery 230 by controlling the DC/DC converter current to flow into the battery 230. This action subtracts the battery current from the photovoltaic current, reducing the rate of change of the plant output power to be equal to the positive power rate change limit. In this mode, the battery 230 is charged and energy is stored. If the energy released and absorbed over time is equal, the overall state of charge of the battery 230 will be reduced only by the charging and discharging losses.

In systems that employ a limited energy battery 230 (i.e. rated power for less than 60 minutes), the plant control system 210 monitors the state of charge (SOC) of the battery 230. The plant control system 210 adjusts the positive power rate change limit when the SOC reaches a user-defined lower capacity limit. The plant control system 210 adjusts the negative power rate change limit when the SOC reaches a user defined upper capacity limit. If the battery 230 reaches the upper capacity limit, the negative power rate change limit is reduced to facilitate a quicker discharge rate during negative power rate change conditions, preventing the battery 230 from reaching maximum capacity. The plant control system 210 contains a programmable hysteresis for the upper capacity limit. The upper capacity hysteresis limit is included to prevent rapid changing of the negative power rate change limit after the upper capacity limit has been reached. For the plant control system 210 to return the negative power rate change limit to its normal value, the SOC must drop below the upper capacity hysteresis limit. If the battery 230 reaches its maximum SOC, the plant control system 210 will control the inverter 220 to reduce the plant output rate of change by curtailing photovoltaic power. If the battery 230 reaches the lower capacity limit, the positive power rate change limit is decreased to facilitate a quicker charge rate during positive power rate change conditions, preventing the battery 230 from reaching its zero capacity level. The plant control system 210 contains a programmable hysteresis for the lower capacity limit. The lower capacity hysteresis limit is included to prevent rapid changing of the positive power rate change limit after the lower capacity limit has been reached. For the plant control system 210 to return the positive rate change limit to its normal value, the SOC must rise above the lower capacity hysteresis limit. The control system 210 continuously monitors grid output power and battery SOC, and automatically adjusts battery power level, power flow direction, and rate of change, if necessary, so that the grid output power rate of change is contained within the power output rate change band and battery availability is maximized. When the output rate of change is within the power output rate change band, the battery power is reduced to zero. When the battery SOC is between the upper and lower capacity limits, the positive and negative power rate change limits are set to their normal values.

The plant control system 210 also monitors the transition between power output rate change conditions. The plant control system 210 may contain an inertia set point. The purpose of this programmed inertia is to suppress the rate of the power output change rate when the plant transitions to a different power rate change condition including the transition from a negative power rate change to a positive power rate change or the transition from a positive power rate change to a negative power rate change. The plant control system 210 may use the measurement from the irradiance sensor 250 to serve as an anticipatory indicator in determining when a change in the power rate change limits should be made and the approximate new value of the power rate change limits. If the irradiance measurement reaches a stable minimum or maximum value, the plant control system 210 can slow the plant output rate of change to near 0% per minute. If the irradiance sensor 250 indicates an increasing irradiance level, the plant control system 210 will control the DC/DC converter 215 to adjust the rate at which the battery 230 is charging, up to the allowable positive power rate change limit. If the irradiance sensor 250 indicates a decreasing irradiance level, the plant control system 210 will control the DC/DC converter 215 to adjust the rate at which the battery 230 is discharging, up to the allowable negative power rate change limit.

Additional plant control input is received from weather forecasting service data 245 and from ground based solar radiation sensors 250. Sensors 250 on the ground at the photovoltaic array site 205 and sensors 250 located within an appropriate distance from the photovoltaic plant in the general direction of prevailing winds and weather are used to determine impending cloud cover in order to manage plant output and the energy storage system SOC. Should an impending change in cloud cover be detected by sensors 250, the plant control system 210 may anticipate the effect on photovoltaic plant irradiance level and adjust the SOC of the battery 230 either higher or lower, as needed, by either charging or discharging the battery 230 to minimize plant output variability. Whenever the control system 210 determines that the energy storage system will not be needed to reduce photovoltaic power variability based on weather forecast data, it shall make the battery 230 available for grid frequency regulation, other revenue producing ancillary services, and peak load shifting, depending upon auxiliary source capacity.

The weather forecasting service data 245 can also provide a predetermined energy/power schedule determined by solar energy production forecasting techniques. The energy/power forecast schedule may predict the energy and average power expected from the plant for each hour of production. Based on the forecast received from the weather forecasting service data 245, the control system 210 can set an upper power forecast limit and a lower power forecast limit based on the average forecasted power within an hour period. Within each hour period, the plant control system 210 monitors the plant output power. If the plant output power is within the upper and lower power forecast limits for the hour, the plant control system 210 will operate the plant to maintain the rate of change of the plant output to be within the positive and negative limits of the power output rate change band described herein. If the upper power forecast limit is reached within the hour, the plant control system 210 will control the DC/DC converter 215 to charge the battery 230 to maintain constant power at the plant output equal to the upper power forecast limit. If the lower power forecast limit is reached within the hour, the plant control system 210 will control the DC/DC converter 215 to discharge the battery 230 to maintain constant power at the plant output equal to the lower power forecast limit. When changing scheduling intervals, the plant control system 210 will control the DC/DC converter 215 to maintain the rate of change of the plant output power to be within the positive and negative limits of the power output rate change band. The goal of incorporating the weather forecasting service data 245 is to minimize any revenue penalties due to the net energy deviation from scheduled energy production based on predetermined criteria associated with utility rate structures and tariffs.

Figure 6:
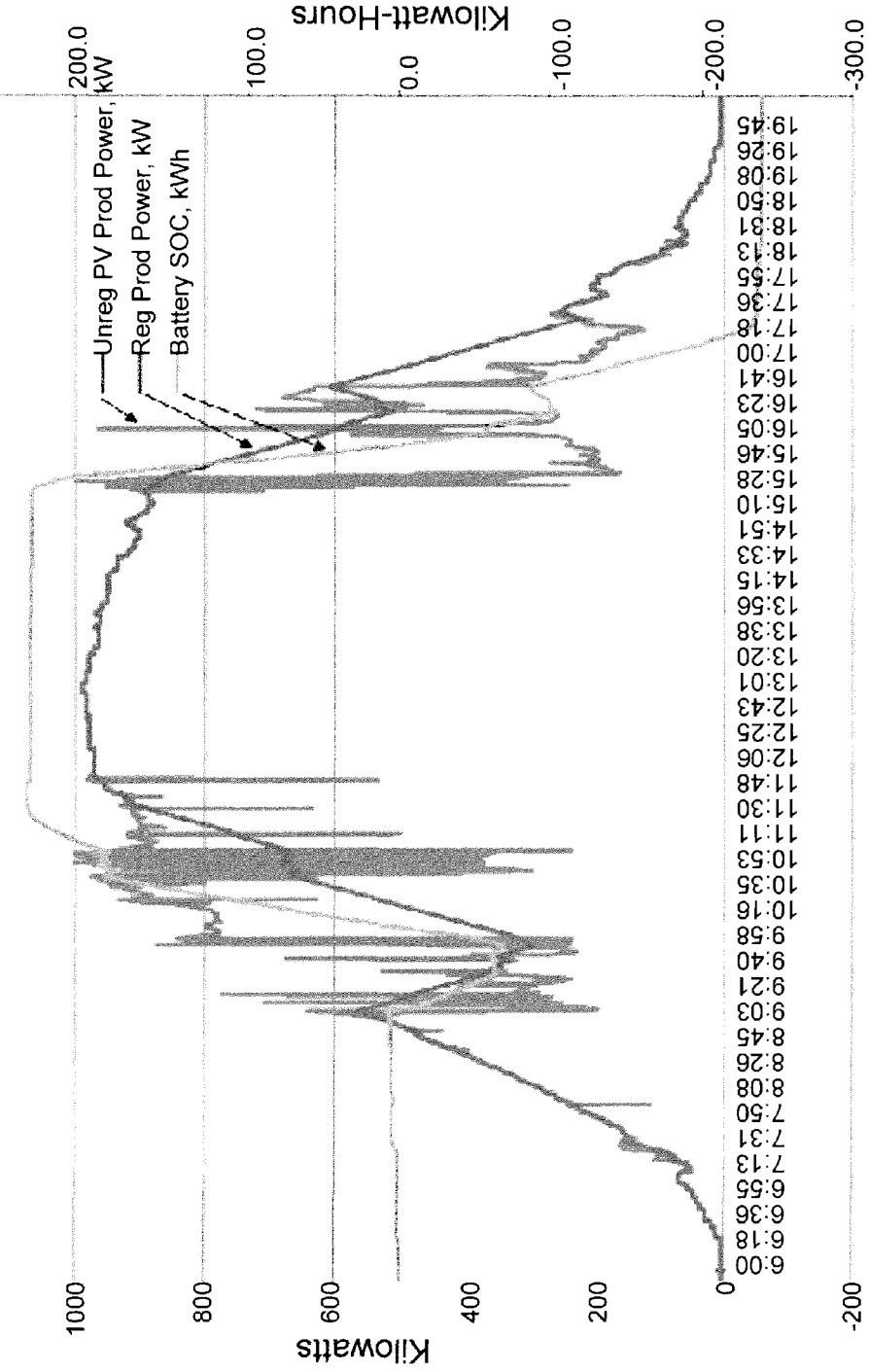
FIG. 6 is an illustration graph of photovoltaic plant power output with low rate of change control.

In systems that employ higher capacity stored energy sources (i.e. rated power for more than 60 minutes), the photovoltaic plant control algorithm for reducing variability of output power is adaptive so that battery rate of charge and discharge, battery state of charge (SOC), and battery energy in/out, averaged over a rolling period of time, is used to adjust the positive and negative limits of the power output rate change band. The algorithm optimizes energy storage capacity by reducing the normal plant output as variability, magnitude, and duty cycle increases and increasing normal plant output power as variability, magnitude, and duty cycle decreases. The goal of this algorithm is to replace energy discharged plus losses from the photovoltaic array 205 over time. If the power available to the inverter 220 is greater than the maximum capability of the inverter 220, evidenced by an operating mode of the inverter 220 known as clipping or current limiting, the plant control system 210 will control the DC/DC converter 215 to charge the battery 230 at a rate that permits the inverter 220 to deliver maximum power to the grid 225 without clipping or current limiting. The control system 210 continuously monitors grid output power and battery SOC and automatically adjusts battery power level, power flow direction, and rate of change, if necessary, so that grid output power rate of change is within the positive and negative limits of the power output rate change band and battery availability is maximized. When the plant output rate of change is within the power rate change limits, the battery power is reduced to zero. When the battery SOC is between high and low levels, the positive and negative power rate change limits are set to their normal values. A one day operational cycle of this algorithm is shown in FIG. 6.

In systems that employ higher capacity stored energy sources (i.e. rated power for more than 60 minutes), the photovoltaic plant control algorithm for reducing variability of output power can be a constant dispatch signal. The dispatch signal shall be defined by the plant control system 210. The algorithm optimizes energy storage capacity by allowing the normal plant output energy to be delivered coincident with the peak utility demand and the highest time of day (TOD) rates. Through this method of control, the plant outputs a constant power level in accordance with the dispatch set point. The plant output is restricted to operate within the power output rate change band described above. If the dispatch level is changed, the plant output power will be regulated not to exceed the positive or negative power rate change limits. The goal of this algorithm is to provide constant power output, maximize economic dispatch and recover energy discharged plus losses from the photovoltaic array 205 over time. If the power available to the inverter 220 is greater than the dispatch set point, the plant control system 210 will control the DC/DC converter 215 to charge the battery 230 at a rate that permits the inverter 220 to deliver constant power to the grid 225. If the power available to the inverter 220 is less than the dispatch set point, the plant control system 210 will control the DC/DC converter 215 to discharge the battery 230 at a rate that permits the inverter 220 to deliver constant power to the grid 225. The control system 210 continuously monitors grid output power and battery SOC and automatically adjusts battery power level, power flow direction so that grid output power is constant in accordance with the dispatch set point. If the plant control system 210 is commanded to change its dispatch set point, the plant control system shall raise or lower the output power at a rate that maintains plant output within the limits of power output rate change band.

Figure 3:
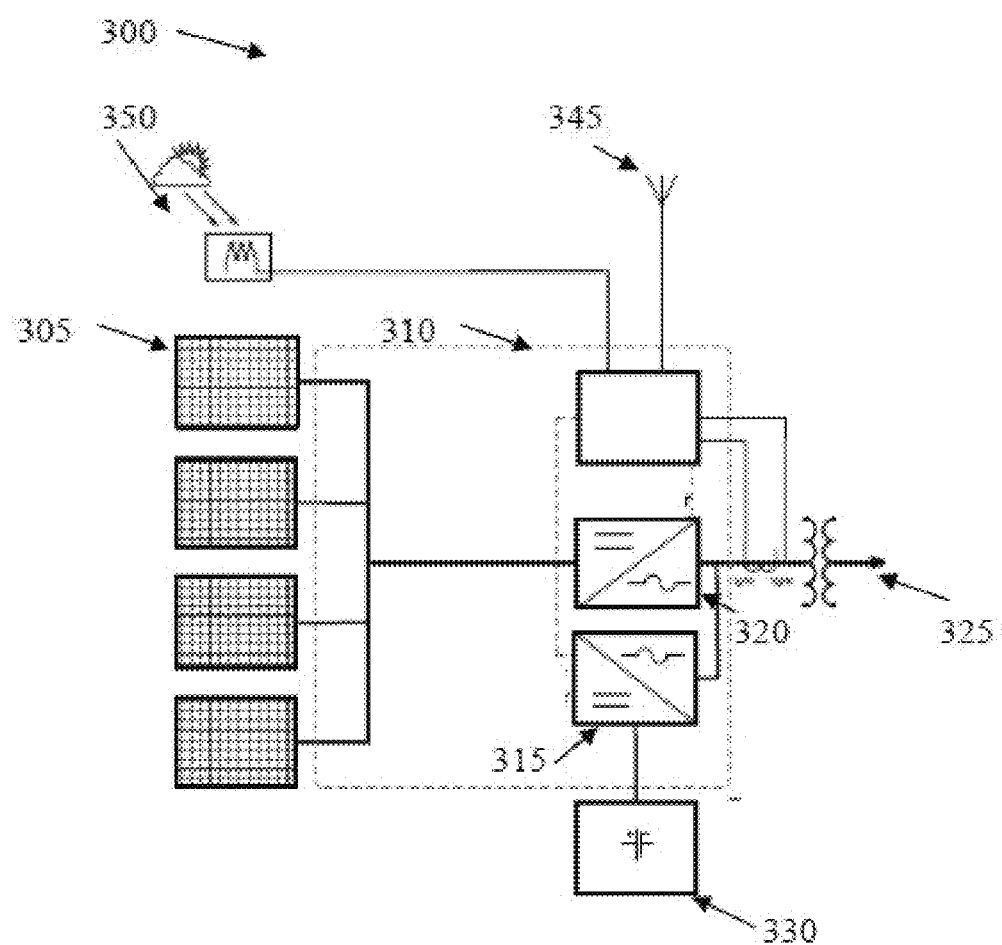
FIG. 3 is a schematic of a photovoltaic power plant with an AC connected battery.

Referring now to FIG. 3, the system has a defined algorithm. As shown in FIG. 3, the system 300 includes photovoltaic arrays 305 connected to a plant control system 310. The plant control system 310 includes a battery inverter 315 and a photovoltaic inverter 320. The photovoltaic arrays 305 are connected to the photovoltaic inverter 320 and then to the grid 325. Additionally, a battery 330 may be one of the stored energy devices previously described. The battery 330 is normally maintained at approximately 50% state of charge. Connected to the battery inverter 315, the battery 330 is used to reduce the variability of the photovoltaic power plant output. Unlike in the system of FIG. 2, however, the battery inverter 320 is connected at the AC or grid side of the inverter 320.

When the rate of change in photovoltaic plant output power exceeds the limits of a power output rate change band, e.g., faster than 3% per minute, positive or negative, the plant control system 310 controls the battery inverter 315 to either supply power from or to the battery 330 to control the change in power delivered to the grid 325 within the normal positive and negative limits of the power output rate change band. The power output rate change band is defined by separate and independently changeable positive and negative power rate change limits. The negative power rate change limit may be any value between 0 and −100% per minute. The positive power rate change limit may be any value between and 0 and +100% per minute. The power rate change limits may be pre-set by the user and may be automatically adjusted by the plant control system 310 based on local variability limitations, current or scheduled plant operating conditions, time of day, or current or forecasted weather conditions. Other user-defined pre-sets are included to set boundaries on power levels, stored energy control, and auxiliary power source operation, as explained herein. For instance, when photovoltaic power decreases at a rate faster than the negative power rate change limit, energy stored in the battery 330 is discharged by controlling battery inverter power to flow from the battery 330 to the grid 325. This action adds the battery power to the photovoltaic plant output power, reducing the rate of change of the plant power output to be equal to the negative power rate change limit. In this mode, the battery 330 is discharged and energy is lost. The photovoltaic plant control system 310 continuously monitors grid output power and adjusts the battery inverter power level and direction, when necessary, so that grid output power is within the positive and negative limits of the power output rate change band. When the photovoltaic output rate of change is within the positive and negative limits of the power output rate change band, the battery inverter current is reduced ultimately to zero. Similarly, if photovoltaic output power increases at a rate faster than the positive power rate change limit, a portion of the photovoltaic plant output power is delivered to the battery 330 by controlling the battery inverter power to flow into the battery 330. This action subtracts the battery power from the photovoltaic plant output power, reducing the rate of change of the plant output power to be equal to the positive power rate change limit. In this mode the battery 330 is charged and energy is stored. If the energy released and absorbed over time is equal, the overall state of charge of the battery will reduced only by the charging and discharging losses.

In systems that employ a limited energy battery 330 (i.e. rated power for less than 60 minutes), the control system 310 monitors the state of charge (SOC) of the battery 330. The plant control system 310 adjusts the positive power rate change limit when the SOC reaches a user-defined lower capacity limit. The plant control system 310 adjusts the negative power rate change limit when the SOC reaches a user defined upper capacity limit. If the battery 330 reaches the upper capacity limit, the negative power rate change limit is reduced to facilitate a quicker discharge rate during negative power rate change conditions, preventing the battery 330 from reaching maximum capacity. The plant control system 310 contains a programmable hysteresis for the upper capacity limit. The upper capacity hysteresis limit is included to prevent rapid changing of the negative power rate change limit after the upper capacity limit has been reached. For the plant control system 310 to return the negative power rate change limit to its normal value, the SOC must drop below the upper capacity hysteresis limit. If the battery 330 reaches its maximum SOC, the plant control system 310 will control the inverter 320 to reduce the plant output rate of change by curtailing photovoltaic power. If the battery 330 reaches the lower capacity limit, the positive power rate change limit is decreased to facilitate a quicker charge rate during positive power rate change conditions, preventing the battery 330 from reaching its zero capacity level. The plant control system 310 contains a programmable hysteresis for the lower capacity limit. The lower capacity hysteresis limit is included to prevent rapid changing of the positive power rate change limit after the lower capacity limit has been reached. For the plant control system 310 to return the positive power rate change limit to its normal value, the SOC must rise above the lower capacity hysteresis limit. The control system 310 continuously monitors grid output power and battery SOC and automatically adjusts battery power level, power flow direction, and rate of change, if necessary, so that grid output power rate of change is within the operating band and battery availability is maximized. When the output rate of change is within the power output rate change band, the battery power is reduced to zero. When the battery SOC is between the upper and lower capacity limits, the positive and negative power rate change limits are set to their normal values. A day's operational cycle of this algorithm is shown in FIG. 7.

The plant control system 310 also monitors the transition between power output rate change conditions. The plant control system 310 may contain an inertia set point. The purpose of this programmed inertia is to suppress the rate of the power output change rate when the plant transitions to a different power rate change condition including the transition from a negative power rate change to a positive power rate change or the transition from a positive power rate change to a negative power rate change. The plant control system 310 may use the measurement from the irradiance sensor 350 to serve as an anticipatory indicator in determining when a change in the power rate change limits should be made and the approximate new value of the power rate change limits. If the irradiance measurement reaches a stable minimum or maximum value, the plant control system 310 can slow the plant output rate of change to near 0% per minute. If the irradiance sensor 350 indicates an increasing irradiance level, the plant control system 310 will control the battery inverter 315 to adjust the rate at which the battery 330 is charging, up to the allowable positive power rate change limit. If the irradiance sensor 350 indicates a decreasing irradiance level, the plant control system 310 will control the battery inverter 315 to adjust the rate at which the battery 330 is discharging, up to the allowable negative power rate change limit.

Additional plant control input is received from weather forecasting service data 345 and from ground based solar radiation sensors 350. Sensors 350 on the ground at the photovoltaic array site 305 and sensors 350 located within an appropriate distance from the photovoltaic plant in the general direction of prevailing winds and weather are used to determine impending cloud cover in order to manage plant output and the energy storage system SOC. Should an impending change in cloud cover be detected by sensors 350, the plant control system 310 may anticipate the effect on photovoltaic plant irradiance level and adjust the SOC of the battery 330 either higher or lower, as needed, by either charging or discharging the battery 330 to minimize plant output variability. Whenever the control system 310 determines that the energy storage system will not be needed to reduce photovoltaic power variability based on weather forecast data, it shall make the battery 330 available for grid frequency regulation, other revenue producing ancillary services, and peak load shifting, depending upon auxiliary source capacity.

The weather forecasting service data 345 can also provide a predetermined energy/power schedule determined by solar energy production forecasting techniques. The energy/power forecast schedule may predict the energy and average power expected from the plant for each hour of production. Based on the forecast received from the weather forecasting service data 345, the control system 310 can set an upper power forecast limit and a lower power forecast limit based on the average forecasted power within an hour period. Within each hour period, the plant control system 310 monitors the plant output power. If the plant output power is within the upper and lower power forecast limits for the hour, the plant control system 310 will operate the plant to maintain the rate of change of the plant output to be within the positive and negative limits of the power output rate change band described herein. If the upper power forecast limit is reached within the hour, the plant control system 310 will control the battery inverter 315 to charge the battery 330 to maintain constant power at the plant output equal to the upper power forecast limit. If the lower power forecast limit is reached within the hour, the plant control system 310 will control the battery inverter 315 to discharge the battery 330 to maintain constant power at the plant output equal to the lower power forecast limit. When changing scheduling intervals, the plant control system 310 will control the battery inverter 315 to maintain the rate of change of the plant output power to be within the positive and negative limits of the power output rate change band. The goal of incorporating the weather forecasting service data 345 is to minimize any revenue penalties due to the net energy deviation from scheduled energy production based on predetermined criteria associated with utility rate structures and tariffs.

In systems that employ higher capacity stored energy sources (i.e. rated power for more than 60 minutes), the photovoltaic plant control algorithm for reducing variability of output power is adaptive so that battery rate of charge and discharge, battery state of charge (SOC), and battery energy in/out, averaged over a rolling period of time, is used to adjust the positive and negative limits of the power output rate change band. The algorithm optimizes energy storage capacity by reducing the normal plant output as variability, magnitude, and duty cycle increases and increasing normal plant output power as variability, magnitude, and duty cycle decreases. The goal of this algorithm is to replace energy discharged plus losses from the photovoltaic array over time.

In systems that employ higher capacity stored energy sources (i.e. rated power for more than 60 minutes), the photovoltaic plant control algorithm for reducing variability of output power can be a constant dispatch signal. The dispatch signal shall be defined by the plant control system 310. The algorithm optimizes energy storage capacity by allowing the normal plant output energy to be delivered coincident with the peak utility demand and with the highest time of day (TOD) rates. Through this method of control, the plant outputs a constant power level in accordance with the dispatch set point. The plant output is restricted to operate within the power output rate change band described above. If the dispatch level is changed, the plant output power will be regulated not to exceed the positive or negative power rate change limits. The goal of this algorithm is to provide constant power output, maximize economic dispatch and recover energy discharged plus losses from the photovoltaic array 305 over time. If the power delivered by the photovoltaic inverter 320 is greater than the dispatch set point, the plant control system 310 will control the battery inverter 315 to charge the battery 330 at a rate that permits the system to provide constant power to the grid 325. If the power delivered by the photovoltaic inverter 320 is less than the dispatch set point, the plant control system 310 will control the battery inverter 315 to discharge the battery 330 at a rate that permits the system to deliver constant power to the grid 325. The control system 310 continuously monitors grid output power and battery SOC and automatically adjusts battery power level, power flow direction so that grid output power is constant in accordance with the dispatch set point. If the plant control system 310 is commanded to change its dispatch set point, the plant control system shall raise or lower the output power at a rate that maintains the plant output within the limits of the power output rate change band.

Figure 4:
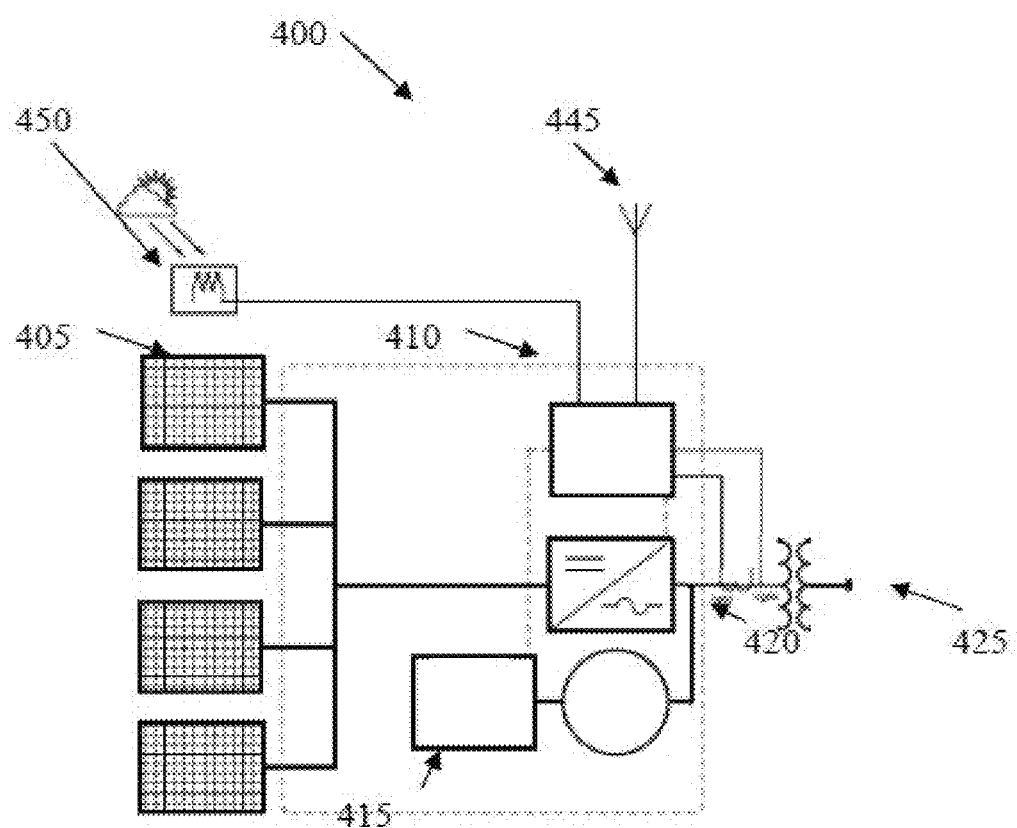
FIG. 4 is a schematic of a photovoltaic power plant with a generator.

Referring now to FIG. 4, the system has a defined algorithm. As shown in FIG. 4, the system 400 includes photovoltaic arrays 405 connected to a plant control system 410. The plant control system 410 includes a generator 415 and a photovoltaic inverter 420. The photovoltaic arrays 405 are connected to the photovoltaic inverter 420 and then to the grid 425. The generator 415 may be one of the types previously described. The generator 415 is connected to the grid 425 and normally operated at a load level that permits it to be increased or decreased by an amount equal to approximately 30 to 40% of the photovoltaic plant rated AC output. A 10 MW rated photovoltaic plant would need a generator plant capable of 10 MW peak power (non-continuous) and normally would be operating at a load point equal to 65% of the photovoltaic plant output over the course of an operating day. The generator 415 is used to reduce the variability of the photovoltaic power plant output. Like in the system of FIG. 3, the generator 415 is connected at the AC or grid side of the photovoltaic inverter 420.

When the rate of change of the photovoltaic plant output power exceeds the limits of the power output rate change band, e.g., faster than 3% per minute, positive or negative, the plant control system 410 controls the generator 415 to either decrease or increase power to control the change in power delivered to the grid 425. As above, the power output rate change band is defined by separate and independently changeable positive and negative power rate change limits. The negative power rate change limit may be any value between 0 and −100% per minute. The positive power rate change limit may be any value between and 0 and +100% per minute. The power rate change limits may be pre-set by the user and may be automatically adjusted by the plant control system 410 based on local variability limitations, current or scheduled plant operating conditions, time of day, or current or forecasted weather conditions. Other user-defined pre-sets are included to set boundaries on power levels and auxiliary power source operation, as explained herein. For instance, when photovoltaic power decreases at a rate faster than the negative power rate change limit, the generator power is increased to the grid 425. This action adds to photovoltaic plant output power, reducing the rate of change of the plant output power to be equal to the negative power change rate limit. The photovoltaic plant control system 410 continuously monitors grid output power and adjusts the generator power level, when necessary, so that grid output power is within the positive and negative limits of the power output rate change band. When photovoltaic output rate of change is within the positive and negative limits of the power output rate change band, the generator power is set to its normal operating load point. Similarly, if photovoltaic output power increases faster than positive power rate change limit, generator power is decreased. This action subtracts power from photovoltaic plant output power, reducing the rate of change of the plant output power to be equal to the positive power rate change limit.

The plant control system 410 also monitors the transition between power output rate change conditions. The plant control system 410 may contain an inertia set point. The purpose of this programmed inertia is to suppress the rate of the power output change rate when the plant transitions to a different power rate change condition including the transition from a negative power rate change to a positive power rate change or the transition from a positive power rate change to a negative power rate change. The plant control system 410 may use the measurement from the irradiance sensor 450 to serve as an anticipatory indicator in determining when a change in the power rate change limits should be made and the approximate new value of the power rate change limits. If the irradiance measurement reaches a stable minimum or maximum value, the plant control system 410 can slow the plant output rate of change to near 0% per minute. If the irradiance sensor 450 indicates an increasing irradiance level, the plant control system 410 will adjust the rate at which the generator 415 reduces its output power, up to the allowable positive power rate change limit. If the irradiance sensor 450 indicates a decreasing irradiance level, the plant control system 410 will adjust the rate at which the generator 415 increases its output power, up to the allowable negative power rate change limit.

Additional plant control input is received from weather forecasting service data 445 and from ground based solar radiation sensors 450. Sensors 450 on the ground at the photovoltaic array site 405 and sensors 450 located within an appropriate distance from the photovoltaic plant in the general direction of prevailing winds and weather are used to determine impending cloud cover in order to manage plant output and the base load power output from the generator 415. Should an impending change in cloud cover be detected by sensors 450, the plant control system 410 may anticipate the effect on photovoltaic plant irradiance level and adjust the power output of the generator 415 either higher or lower, as needed to minimize plant output variability.

The weather forecasting service data 445 can also provide a predetermined energy/power schedule determined by solar energy production forecasting techniques. The energy/power forecast schedule may predict the energy and average power expected from the plant for each hour of production. Based on the forecast received from the weather forecasting service data 445, the control system 410 can set an upper power forecast limit and a lower power forecast limit based on the average forecasted power within an hour period. Within each hour period, the plant control system 410 monitors the plant output power. If the plant output power is within the upper and lower power forecast limits for the hour, the plant control system 410 will operate the plant to maintain the rate of change of the plant output to be within the positive and negative limits of the power output rate change band described herein. If the upper power forecast limit is reached within the hour, the plant control system 410 will command the generator 415 to reduce its output power and maintain constant power at the plant output equal to the upper power forecast limit. If the lower power forecast limit is reached within the hour, the plant control system 410 will command the generator 415 to increase its output and maintain constant power at the plant output equal to the lower power forecast limit. When changing scheduling intervals, the plant control system 410 will control the generator 415 to maintain the rate of change of the plant output power to be within the positive and negative limits of the power output rate change band. The goal of incorporating the weather forecasting service data 445 is to minimize any revenue penalties due to the net energy deviation from scheduled energy production based on predetermined criteria associated with utility rate structures and tariffs.

Figure 5:
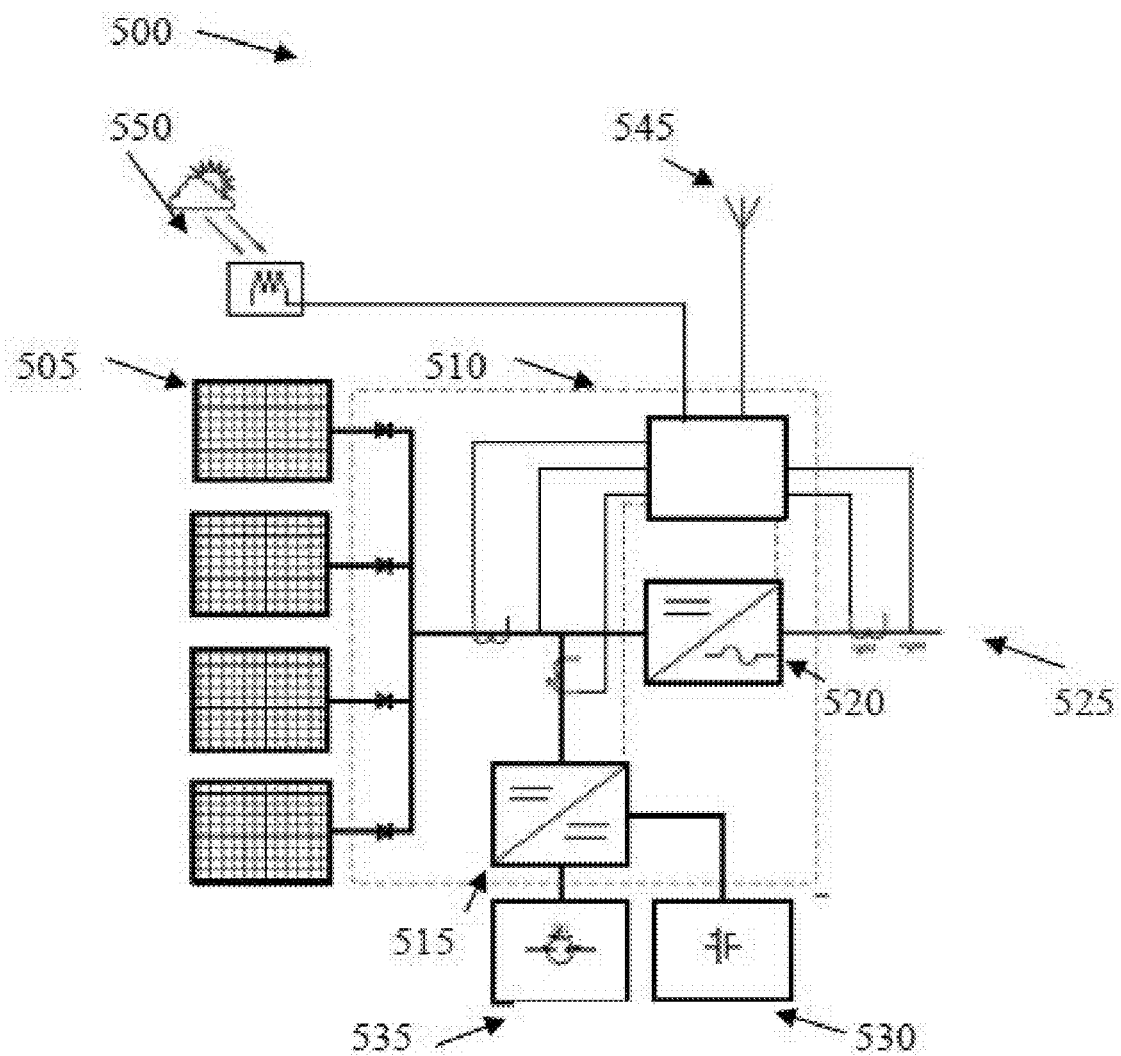
FIG. 5 is a schematic of a photovoltaic power plant with a fuel cell.

Referring now to FIG. 5, the system has a defined algorithm. As shown in FIG. 5, the system 500 includes photovoltaic arrays 505 connected to a plant control system 510. The plant control system 510 includes a DC/DC converter 515 and an inverter 520. The photovoltaic arrays 505 are connected to the inverter 520 and then to the grid 525. Additionally, a battery 530 and fuel cell 535 are connected to the DC/DC converter 515. The combination of the battery 530 and fuel cell 535 as the auxiliary power source is used to reduce the variability of the photovoltaic power plant output. The battery 530 may be one of the stored energy devices previously described and is included in the system to provide rapid response. The fuel cell 535 is intended to provide bulk energy. The battery 530 is normally maintained at approximately 50% state of charge. Additionally, similar to the systems described above, additional information is received from weather forecasting service data 545 and from ground based solar radiation sensors 550. Similar to the system 400 shown in FIG. 4, the fuel cell 535 is normally operated at a load level that permits it to be increased or decreased by an amount equal to approximately 30 to 40% of the photovoltaic plant rated AC output. A 10 MW rated photovoltaic plant would need a fuel cell plant capable of 10 MW peak power (non-continuous) and normally would be operating at a load point equal to 65% of photovoltaic plant output over the course of an operating day.

When solar variability causes the rate of change of the photovoltaic plant output power to exceed the limits of the power output rate change band, e.g., faster than 3% per minute, positive or negative, the photovoltaic plant control system 510 controls the DC/DC converter 515 to either supply current from or to the battery 530 to control the current into the inverter 520 to maintain the change in power delivered to the grid 525 within the positive and negative power rate change limits. Concurrently, the plant control system 510 will increase or decrease the output of the fuel cell 535 to follow the action of the battery 530. In this way the system operates similarly to the one shown in FIG. 4. The system 500 can maintain separate and independently changeable positive and negative power rate change limits. The negative power rate change limit of the band may be any value between 0 and −100% per minute. The positive power rate change limit may be any value between and 0 and +100% per minute. The system 500 can further include set points that can be automatically changed by the plant control system in response to photovoltaic power plant operating conditions and weather conditions. The system 500 can also include inertial set points to suppress the rate of the power output change rate when transitioning between different power rate change conditions.

In general, a photovoltaic system is comprised of several modules. A module is comprised of two or more submodules connected in parallel. A submodule is comprised of series-connected individual cells. Photovoltaic modules can be used in arrays of many, interconnected modules.

A common photovoltaic cell can have multiple layers. The multiple layers can include a bottom layer that is a transparent conductive layer, a capping layer, a window layer, an absorber layer and a top layer. Each layer can be deposited at a different deposition station of a manufacturing line with a separate deposition gas supply and a vacuum-sealed deposition chamber at each station as required. The substrate can be transferred from deposition station to deposition station via a rolling conveyor until all of the desired layers are deposited. A top substrate layer can be placed on top of the top layer to form a sandwich and complete the photovoltaic cell.

The total output current of the module is the sum of the currents of each of the sub-modules. Thus, the optimum design of sub-modules within a module is determined by system requirements. In general, photovoltaic modules are formed by the deposition of multiple semiconductor or organic thin films on rigid or flexible substrates or superstrates. The term superstrate is generally used if the light incident on a module passes through the transparent substrate used for semiconductor or organic film deposition. Electrical contact to the solar cell material on the substrate side can be provided by an electrically conductive substrate material or an electrically conductive layer between the solar cell material and the substrate such as a transparent conductive layer or a transparent conductive oxide (TCO). For superstrates, electrical contact on the substrate side of the solar cell material can be provided by patterned metal layers and/or a TCO, for example.

A photovoltaic cell can include a second semiconductor material over the first semiconductor material. The first semiconductor material can be a CdS. The second semiconductor material can be a CdTe. The substrate can be glass. A photovoltaic cell can be part of a submodule, which includes greater than 50 cells. The submodule can also include greater than 80 cells. The submodule can also include greater than 100 cells.

A method of manufacturing a system can include providing a transparent conductive layer on a substrate, contacting a first submodule and a second submodule with the transparent conductive layer through a shared cell, the first submodule and second submodule being connected in parallel, the first submodule having an electrical contact region including a first trench pattern, wherein the first trench pattern is a pattern of photovoltaic cells connected in series and a last cell in the series is the shared cell.

A method of forming a photovoltaic structure can include depositing a semiconductor layer over a transparent conductive layer, scribing the semiconductor layer to form a cell, the cell comprising a semiconductor material shared by two parallel connected submodules, and metallizing the cell.

A method of forming a photovoltaic structure can include depositing a semiconductor layer over a transparent conductive layer, scribing a semiconductor layer to form a cell, placing a metal layer over the cell and forming two electrical contacts between the transparent conductive layer and the metal layer.

In this system, a photovoltaic cell can be constructed of a series of layers of semiconductor materials deposited on a glass substrate. In an example of a common photovoltaic cell, the multiple layers can include: a bottom layer that is a transparent conductive layer, a window layer, an absorber layer, and a top layer. The top layer can be a metal layer. Each layer can be deposited at a different deposition station of a manufacturing line with a separate deposition gas supply and a vacuum-sealed deposition chamber at each station as required. The substrate can be transferred from deposition station to deposition station via a rolling conveyor until all of the desired layers are deposited. Additional layers can be added using other techniques such as sputtering. Electrical conductors can be connected to the top and the bottom layers respectively to collect the electrical energy produced when solar energy is incident onto the absorber layer. A top substrate layer can be placed on top of the top layer to form a sandwich and complete the photovoltaic device.

The bottom layer can be a transparent conductive layer, and can be for example a transparent conductive oxide such as zinc oxide, zinc oxide doped with aluminum, tin oxide or tin oxide doped with fluorine. Sputtered aluminum doped zinc oxide has good electrical and optical properties, but at temperatures greater than 500° C., aluminum doped zinc oxide can exhibit chemical instability. In addition, at processing temperatures greater than 500° C., oxygen and other reactive elements can diffuse into the transparent conductive oxide, disrupting its electrical properties.

The window layer and the absorbing layer can include, for example, a binary semiconductor such as group II-VI, III-V or IV semiconductor, such as, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, or mixtures, compounds or alloys thereof. An example of a window layer and absorbing layer is a layer of CdS coated by a layer of CdTe.

A metal layer can be deposited as an electrical contact to a semiconductor layer for solar device operation, as taught, for example, in U.S. Patent Application Ser. No. 60/868,023, which is hereby incorporated by reference in its entirety. A metal layer can be a composite layer comprised of metal layers, such as a Cr/Al/Cr metal stack. The metal layers in a composite layer can be metals that have a thermal expansion coefficient between the semiconductor layer and a first metal layer. Metal adhesion is impacted by intrinsic stress, which is a function of deposition variables. Metal adhesion is also impacted by extrinsic stresses such as post-deposition thermal treatment in which case dissimilarity in thermal expansion coefficients may contribute to reduced adhesion. A proper sequential arrangement of metals, such as chromium, nickel, and aluminum, can provide a gradient in thermal expansion of the metal stack thereby minimizing loss of adhesion during thermal processing.

Additional metal layers can be added in order to provide a gradient of thermal expansion coefficients thereby minimizing de-lamination during heat treatment. Adhesion has been shown to be improved when thermal expansion coefficients of selected materials were more closely matched.

Additional layers, such as a protective layer of material with a high chemical stability, or a capping layer can also be provided. Capping layers are described, for example, in U.S. Patent Publication 20050257824, which is incorporated by reference herein.

A method of making a photovoltaic cell can include placing a semiconductor layer on a substrate and depositing a metal layer in contact with a semiconductor layer to metallize a photovoltaic cell. In certain circumstances a metal layer can be a chromium-containing layer. In other circumstances, metal layers can be deposited sequentially to form a metal stack. For example, a first metal layer can be a chromium-containing layer, a third metal layer can be an aluminum-containing layer, and second layer between the first and third metal layers can be a nickel-containing layer. In another embodiment, a photovoltaic device can further comprise a fourth layer, wherein the fourth layer is an intermediate layer between the second metal layer and the third metal layer. The intermediate layer can be a nickel-containing layer. A metal layer can also include tungsten, molybdenum, iridium, tantalum, titanium, neodymium, palladium, lead, iron, silver, or nickel.

In certain circumstances, a capping layer can be deposited in addition to a tin oxide protective layer. A capping layer can be positioned between the transparent conductive layer and the window layer. The capping layer can be positioned between the protective layer and the window layer. The capping layer can be positioned between the transparent conductive layer and the protective layer. The capping layer can serve as a buffer layer, which can allow a thinner window layer to be used. For example, when using a capping layer and a protective layer, the first semiconductor layer can be thinner than in the absence of the buffer layer. For example, the first semiconductor layer can have a thickness of greater than about 10 nm and less than about 600 nm. For example, the first semiconductor layer can have a thickness greater than 20 nm, greater than 50 nm, greater than 100 nm, or greater than 200 nm and less than 400 nm, less than 300 nm, less than 250 nm, or less than 150 nm.

The first semiconductor layer can serve as a window layer for the second semiconductor layer. By being thinner, the first semiconductor layer allows greater penetration of the shorter wavelengths of the incident light to the second semiconductor layer. The first semiconductor layer can be a group II-VI, III-V or IV semiconductor, such as, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, or mixtures, compounds or alloys thereof. It can be a binary semiconductor, for example it can be CdS. The second semiconductor layer can be deposited onto the first semiconductor layer. The second semiconductor can serve as an absorber layer for the incident light when the first semiconductor layer is serving as a window layer. Similar to the first semiconductor layer, the second semiconductor layer can also be a group II-VI, III-V or IV semiconductor, such as, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, or mixtures, compounds or alloys thereof.

Deposition of semiconductor layers in the manufacture of photovoltaic devices is described, for example, in U.S. Pat. Nos. 5,248,349, 5,372,646, 5,470,397, 5,536,333, 5,945,163, 6,037,241, and 6,444,043, each of which is incorporated by reference in its entirety. The deposition can involve transport of vapor from a source to a substrate, or sublimation of a solid in a closed system. An apparatus for manufacturing photovoltaic devices can include a conveyor, for example a roll conveyor with rollers. Other types of systems with or without conveyors can also be used. A conveyor can transport substrates into a series of one or more deposition stations for depositing layers of material on the exposed surface of the substrate. The deposition chamber can be heated to reach a processing temperature of not less than about 450° C. and not more than about 700° C., for example the temperature can range from 450-550°, 550-650°, 570-600° C., 600-640° C. or any other range greater than 450° C. and less than about 700° C. The deposition chamber includes a deposition distributor connected to a deposition vapor supply. The distributor can be connected to multiple vapor supplies for deposition of various layers or the substrate can be moved through multiple and various deposition stations each station with its own vapor distributor and supply. The distributor can be in the form of a spray nozzle with varying nozzle geometries to facilitate uniform distribution of the vapor supply.

Devices including protective layers can be fabricated using soda lime float glass as a substrate. A film of aluminum-doped ZnO can be commercially deposited by sputtering or by atmospheric pressure chemical vapor deposition (APCVD). Other doped transparent conducting oxides, such as a tin oxide can also be deposited as a film. Conductivity and transparency of this layer suit it to serving as the front contact layer for the photovoltaic device.

A second layer of a transparent conducting oxide, such as tin oxide, or tin oxide with zinc can be deposited. This layer is transparent, but conductivity of this layer is significantly lower than an aluminum-doped ZnO layer or a fluorine doped $SnO_2$ layer, for example. This second layer can also serve as a buffer layer, since it can be used to prevent shunting between the transparent contact and other critical layers of the device. The protective layers were deposited in house by sputtering onto aluminum-doped ZnO layers during device fabrication for these experiments. The protective layers were deposited at room temperature. A silicon dioxide capping layer can be deposited over a transparent conducting oxide using electron-beam evaporation.

Devices can be finished with appropriate back contact methods known to create devices from CdTe photovoltaic materials. Testing for results of these devices was performed at initial efficiency, and after accelerated stress testing using UV measurements on a solar simulator. Testing for impact of chemical breakdown in the front contact and protective layers was done with spectrophotometer reflectance measurements, conductivity (sheet resistance) measurements.

A number of embodiments have been described. Nevertheless, it will be understood that various modifications may be made without departing from the spirit and scope of the invention. For example, the semiconductor layers can include a variety of other materials, as can the materials used for the buffer layer and the protective layer. In another example, additional electrical isolation from cell to cell can be achieved by employing additional isolation trenches. Accordingly, other embodiments are within the scope of the following claims.

What is claimed is:

1. A method for reducing power output rate change variability comprising:
   receiving photovoltaic power output from a photovoltaic array;
   measuring a rate of change of the photovoltaic power output; and
   adjusting an auxiliary power source output so that when the auxiliary power source output is combined with the photovoltaic power output, the rate of change of the combined output, known as a plant power output rate of change, is limited within a predefined power output rate change band, wherein the predefined power output rate change band defines a maximum allowable positive and a maximum allowable negative limit for the plant power output rate of change, the maximum allowable positive and negative limits being less than a maximum rate of change of the photovoltaic power output.

2. The method of claim 1, wherein adjusting the auxiliary power source output comprises adjusting a power output of a stored energy system.

3. The method of claim 2, wherein the stored energy system is a high rate rechargeable source with limited energy storage.

4. The method of claim 2, wherein the stored energy system is a low rate rechargeable auxiliary power source with large energy storage.

5. The method of claim 2, wherein the energy storage system uses either a mechanical or electrical device for converting and storing energy.

6. The method of claim 2, wherein the stored energy system is one of an electrolytic cell device, a capacitor, a lead-acid battery, a nickel-cadmium battery, a sodium battery, a lithium-ion battery, a flow battery, or a mechanical kinetic and/or potential energy storage device.

7. The method of claim 2, further comprising increasing an amount of stored energy in the stored energy system when a photovoltaic output power rate of change exceeds a positive limit of the predefined power output rate change band.

8. The method of claim 2, further comprising decreasing photovoltaic power when a photovoltaic output power rate of change exceeds a positive limit of the predefined power output rate change band.

9. The method of claim 2, further comprising maintaining a constant amount of stored energy in the stored energy system when a photovoltaic output power rate of change is within the predefined power output rate change band.

10. The method of claim 2, further comprising decreasing an amount of stored energy in the stored energy system when a photovoltaic output power rate of change exceeds a negative limit of the predefined power output rate change band.

11. The method of claim 2, wherein the output power rate change band is defined by a normal positive power rate change limit and a normal negative power rate change limit.

12. The method of claim 11, further comprising establishing a secondary positive power rate change limit and a secondary negative power rate change limit.

13. The method of claim 12, further comprising establishing an upper capacity limit and a lower capacity limit for the stored energy system to determine the transition from a normal to a secondary power rate change limit.

14. The method of claim 12, further comprising establishing an upper capacity hysteresis limit and a lower capacity hysteresis limit for the stored energy system to determine the transition from a secondary to a normal rate change limit.

15. The method of claim 12, further comprising switching to the secondary positive power rate change limit when a level of stored energy falls below a lower capacity limit to facilitate faster charging of the stored energy system when the output power rate of change is positive.

16. The method of claim 12, further comprising returning to the normal positive power rate change limit when a level of stored energy in the stored energy system rises above a lower capacity hysteresis limit.

17. The method of claim 12, further comprising switching to the secondary negative power rate change limit when a level of stored energy rises above an upper capacity limit to facilitate faster discharging of the stored energy system when the output power rate of change is negative.

18. The method of claim 12, further comprising returning to the normal negative power rate change limit when a level of stored energy in the stored energy system falls below an upper capacity hysteresis limit.

19. The method of claim 2, further comprising dispatching plant output power following a dispatch set point.

20. The method of claim 19, wherein the dispatch set point is constant.

21. The method of claim 19, wherein the dispatch set point is derived from a schedule comprising a series of different points.

22. The method of claim 19, further comprising increasing a level of stored energy in the stored energy system when a photovoltaic output power is greater than a dispatch set point.

23. The method of claim 19, further comprising lowering a level of stored energy in the stored energy system when a photovoltaic output power is less than a dispatch set point.

24. The method of claim 19, further comprising limiting a rate of change of a combined photovoltaic power and stored energy system to operate within the predefined power output rate change band when a dispatch set point is changed.

25. The method of claim 1, wherein adjusting the auxiliary power source output comprises adjusting a power output of an alternative generation device.

26. The method of claim 25, wherein the alternative generation device is one of a fuel cell, a wind turbine generator, a flywheel generator, a gas fueled combustion prime mover-generator, a liquid fueled prime mover-generator, a compressed-gas powered prime mover-generator, or combinations thereof, including an air-powered prime mover-generator.

27. The method of claim 25, further comprising maintaining a constant auxiliary power when a photovoltaic output power rate of change is within the predefined power output rate change band.

28. The method of claim 25, further comprising reducing auxiliary power when a photovoltaic output power rate of change exceeds a positive limit of the predefined power output rate change band.

29. The method of claim 25, further comprising increasing auxiliary power when a photovoltaic output power rate of change exceeds a negative limit of the predefined power output rate change band.

30. The method of claim 25, further comprising decreasing photovoltaic power when a photovoltaic output power rate of change exceeds a positive limit of the predefined power output rate change band.

31. The method of claim 25, further comprising maintaining plant output power at a constant level if photovoltaic output power increases or decreases.

32. The method of claim 1, further comprising establishing a plurality of inertial set points to further suppress the rate of plant output power rate of change when transitioning from a first power rate change condition to a second power rate change condition.

33. The method of claim 1, further comprising measuring an irradiance condition proximate to the photovoltaic array and adjusting the plant output power rate of change based on the irradiance condition.

34. The method of claim 33, further comprising reducing the plant output power rate of change when the measured irradiance reaches a minimum or maximum value.

35. The method of claim 33, further comprising adjusting the rate at which stored energy is increased in the stored energy system, up to the allowable positive power rate change limit, when the irradiance measurement is increasing.

36. The method of claim 33, further comprising adjusting the rate at which stored energy is decreased in the stored energy system, up to the allowable negative power rate change limit, when the irradiance measurement is decreasing.

37. The method of claim 33, further comprising adjusting the rate at which auxiliary power is decreased, up to the allowable positive power rate change limit, when the irradiance measurement is increasing.

38. The method of claim 33, further comprising adjusting the rate at which auxiliary power is increased, up to the allowable negative power rate change limit, when the irradiance measurement is decreasing.

39. The method of claim 1, further comprising establishing plant operation to follow an energy/power schedule based on a solar energy production forecast for each hour of production.

40. The method of claim 39, further comprising establishing an upper and a lower power forecast limit based on the forecasted average power within an hour period.

41. The method of claim 39, further comprising adjusting the auxiliary power or a level of stored energy in the stored energy system to maintain the plant output power rate of change to within the predefined power output rate change band when plant output power is within the upper and lower power forecast limits.

42. The method of claim 39, further comprising decreasing a level of stored energy in the stored energy system to maintain constant plant output power when the plant output power approaches the lower power forecast limit.

43. The method of claim 39, further comprising increasing the amount of stored energy in the stored energy system to maintain constant plant output power when the plant output power approaches the upper power forecast limit.

44. The method of claim 39, further comprising increasing the auxiliary power to maintain constant plant output power when the plant output power approaches the lower power forecast limit.

45. The method of claim 39, further comprising decreasing the auxiliary power to maintain constant plant output power when the plant output power approaches the upper power forecast limit.

46. The method of claim 39, further comprising adjusting auxiliary power or a level energy stored in the stored energy system to maintain the plant power output rate of change within the predefined power output rate change band when transitioning from one scheduled hour to the next scheduled hour.

47. The method of claim 39, further comprising adjusting auxiliary power or a level of stored energy in the stored energy system to control the plant output to minimize any revenue penalties due to the net energy deviation from scheduled based on predetermined criteria associated with utility rate structures and tariffs.

48. The method of claim 1, further comprising adjusting auxiliary power or a level of stored energy level to compensate for anticipated changes in cloud cover.

49. The method of claim 48, further comprising increasing auxiliary power or a level of stored energy when cloud cover is forecast or physically detected.

50. The method of claim 48, further comprising adjusting auxiliary power or a level of stored energy in the absence of cloud cover.

51. The method of claim 48, further comprising reducing auxiliary power or a level of stored energy when no cloud cover is forecast or physically detected.

52. The method of claim 48, further comprising adjusting auxiliary power or a level of stored energy for grid frequency regulation, ancillary services, or load shifting while producing less variable output from a large, grid connected photovoltaic plant.

* * * * *